United States Patent
Liu et al.

(10) Patent No.: US 11,861,130 B2
(45) Date of Patent: Jan. 2, 2024

(54) TOUCH MODULE WITH ALLEVIATED MURA PHENOMENON, MANUFACTURING METHOD THEREOF, AND TOUCH DISPLAY DEVICE COMPRISING THE TOUCH MODULE

(71) Applicant: BOE TECHNOLOGY GROUP CO., LTD., Beijing (CN)

(72) Inventors: Liyan Liu, Beijing (CN); Xinxing Wang, Beijing (CN); Xuefei Sun, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 77 days.

(21) Appl. No.: 17/594,979

(22) PCT Filed: Jan. 28, 2021

(86) PCT No.: PCT/CN2021/074220
§ 371 (c)(1),
(2) Date: Nov. 4, 2021

(87) PCT Pub. No.: WO2022/160201
PCT Pub. Date: Aug. 4, 2022

(65) Prior Publication Data
US 2023/0168776 A1   Jun. 1, 2023

(51) Int. Cl.
*G06F 3/044* (2006.01)
*G06F 3/041* (2006.01)

(52) U.S. Cl.
CPC ............ *G06F 3/0448* (2019.05); *G06F 3/044* (2013.01); *G06F 3/0443* (2019.05);
(Continued)

(58) Field of Classification Search
CPC ...... G06F 3/044; G06F 3/0446; G06F 3/0448; G06F 3/0443; G06F 2203/04111; G06F 2203/04103; G06F 2203/04112
See application file for complete search history.

(56) References Cited

U.S. PATENT DOCUMENTS 10,459,589 B2 * 10/2019 Xu .................. G06F 3/0448
10,928,952 B2 * 2/2021 Wang ............... G06F 3/0443
(Continued)

FOREIGN PATENT DOCUMENTS

CN    103246409 A    8/2013
CN    107085476 A    8/2017
(Continued)

*Primary Examiner* — Darlene M Ritchie
(74) *Attorney, Agent, or Firm* — WOMBLE BOND DICKINSON (US) LLP

(57) ABSTRACT

The present disclosure provides a touch module, a manufacturing method thereof, and a touch display device. The touch module includes: a base substrate; an array of touch units arranged on the base substrate. Each touch unit includes a first touch electrode extending along a first direction and two second touch electrodes arranged on two sides of the first touch electrode along a second direction, the first direction and the second direction intersecting each other; wherein, the touch unit further includes: a bridging region between the two second touch electrodes, and a boundary region between the first touch electrode and each of the second touch electrodes. The bridging region includes a first cutting pattern, the boundary region includes a second cutting pattern, and the first cutting pattern and the second cutting pattern are substantially the same.

14 Claims, 12 Drawing Sheets

(52) U.S. Cl.
CPC .......... *G06F 3/0446* (2019.05); *G06F 3/0412* (2013.01); *G06F 2203/04103* (2013.01); *G06F 2203/04111* (2013.01); *G06F 2203/04112* (2013.01)

(56) References Cited

U.S. PATENT DOCUMENTS

| | | | |
|---|---|---|---|
| 10,990,209 B2* | 4/2021 | Zhang | G06F 3/046 |
| 2006/0232559 A1 | 10/2006 | Chien et al. | |
| 2011/0254804 A1 | 10/2011 | Kuo et al. | |
| 2015/0277627 A1 | 10/2015 | Pang et al. | |
| 2016/0259447 A1* | 9/2016 | Lin | G06F 3/0446 |
| 2017/0147133 A1* | 5/2017 | Choi | G06F 3/0446 |
| 2017/0212629 A1 | 7/2017 | Cho et al. | |
| 2020/0081571 A1* | 3/2020 | Kim | G06F 3/04164 |
| 2020/0089372 A1 | 3/2020 | Park et al. | |
| 2021/0303104 A1* | 9/2021 | Yang | G06F 3/0443 |
| 2021/0311589 A1* | 10/2021 | Ye | G06F 3/0445 |
| 2021/0320153 A1 | 10/2021 | Li | |
| 2021/0373713 A1 | 12/2021 | Kwon et al. | |
| 2022/0179508 A1* | 6/2022 | Jeong | G06F 3/0446 |
| 2022/0291781 A1* | 9/2022 | Wang | G06F 3/0446 |

FOREIGN PATENT DOCUMENTS

| | | | | |
|---|---|---|---|---|
| CN | 110109579 A | 8/2019 | | |
| CN | 110908532 A | 3/2020 | | |
| CN | 111399688 A | 7/2020 | | |
| CN | 111475051 A | 7/2020 | | |
| CN | 111562862 A | 8/2020 | | |
| CN | 111736726 A | 10/2020 | | |
| KR | 102423892 B1 * | 9/2017 | .......... | G06F 3/0412 |

* cited by examiner

300

200

301

TOUCH MODULE WITH ALLEVIATED MURA PHENOMENON, MANUFACTURING METHOD THEREOF, AND TOUCH DISPLAY DEVICE COMPRISING THE TOUCH MODULE

RELATED APPLICATIONS

The present application is a 35 U.S.C. 371 national stage application of PCT International Application No. PCT/CN2021/074220, filed on Jan. 28, 2021, which claims the benefit of PCT International Application No. PCT/CN2021/074220, filed on Jan. 28, 2021, the entire disclosures of which are incorporated herein by reference.

TECHNICAL FIELD

The present disclosure relates to the field of display technologies, especially to a touch module, a manufacturing method thereof, and a touch display device.

BACKGROUND

OLED (Organic Light-Emitting Diode) display devices have advantages of being lighter and thinner, having good flexibility, high color gamut, wide field of view, fast response speed, low power consumption and high resolution, and so on, which have become a research hotspot in the display field in recent years. An On Cell touch panel is one of the key technologies for flexible OLED display screens to reduce thickness and improve flexibility. Compared with an ITO transparent electrode, the driving electrode (Tx) and the sensing electrode (Rx) in a touch module employ a metal mesh electrode material, which is advantaged by low resistance, lightness and thinness, high sensitivity, and so on.

SUMMARY

The present disclosure provides a touch module, a manufacturing method thereof, and a touch display device. In each touch sensing unit, the bridging region includes a first cutting pattern, the boundary region between the first touch electrode and the second touch electrode includes a second cutting pattern, and the first cutting pattern and the second cutting pattern are substantially the same. As a result, the Mura phenomenon (or moiré phenomenon) caused by the bridging region and the boundary region is alleviated.

According to an aspect of the present disclosure, there is provided a touch module. The touch module comprises: a base substrate; an array of touch units arranged on the base substrate, each touch unit comprising a first touch electrode extending along a first direction and two second touch electrodes arranged on two sides of the first touch electrode along a second direction, the first direction and the second direction intersecting each other; wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are substantially the same.

Optionally, in some embodiments, the first cutting pattern and the second cutting pattern have a broken line shape.

Optionally, in some embodiments, the first cutting pattern and the second cutting pattern have a stepped shape.

Optionally, in some embodiments, in a same touch unit, the bridging region has an area substantially the same as that of the boundary region.

Optionally, in some embodiments, in a same touch unit, the two second touch electrodes are spaced apart by 1 to 5 sub-pixels.

Optionally, in some embodiments, in a same touch unit, a bridge that bridges the two second touch electrodes spans 1 to 5 sub-pixels.

Optionally, in some embodiments, at least one of the first touch electrode and the second touch electrodes further comprises a plurality of third cutting patterns.

Optionally, in some embodiments, the first touch electrode and the second touch electrodes are composed of a metal mesh; in the touch unit, cutting openings on the metal mesh that are generated by the plurality of third cutting patterns have a uniform distribution density.

According to another aspect of the present disclosure, there is provided a touch module. The touch module comprises: a base substrate; an array of touch units arranged on the base substrate, each touch unit comprising a first touch electrode extending along a first direction and two second touch electrodes arranged on two sides of the first touch electrode along a second direction, the first direction and the second direction intersecting each other; wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are composed of a same unit pattern having a broken line shape.

Optionally, in some embodiments, the first cutting pattern and the second cutting pattern have a stepped shape.

Optionally, in some embodiments, in a same touch unit, the bridging region has an area substantially the same as that of the boundary region.

Optionally, in some embodiments, in a same touch unit, the two second touch electrodes are spaced apart by 1 to 5 sub-pixels.

Optionally, in some embodiments, in a same touch unit, a bridge that bridges the two second touch electrodes spans 1 to 5 sub-pixels.

Optionally, in some embodiments, at least one of the first touch electrode and the second touch electrodes further comprises a plurality of third cutting patterns.

Optionally, in some embodiments, the first touch electrode and the second touch electrodes are composed of a metal mesh; in the touch unit, cutting openings on the metal mesh that are generated by the plurality of third cutting patterns have a uniform distribution density.

According to a further aspect of the present disclosure, there is provided a touch display device. The touch display device comprises a display panel and the touch module described in any of the foregoing embodiments, the touch module being arranged on a light exit surface of the display panel.

According to yet another aspect of the present disclosure, there is provided manufacturing method of a touch module. The method comprises: providing a base substrate; arranging an array of touch units on the base substrate, each touch unit comprising a first touch electrode extending along a first direction and two second touch electrodes arranged on two sides of the first touch electrode along a second direction, the first direction and the second direction intersecting each other; wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are substantially the same.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

The present disclosure provides a touch module, a manufacturing method thereof, and a touch display device. In each touch sensing unit, a bridging region includes a first cutting pattern, a boundary region between the first touch electrode and each of the second touch electrodes includes a second cutting pattern, and the first cutting pattern and the second cutting pattern are substantially the same. As a result, the Mura phenomenon (or moiré phenomenon) caused by the bridging region and the boundary region is alleviated.

The inventor found that, during the process of manufacturing a touch display device, when the touch module is superimposed on the display module such as an OLED backplate, the metal meshes with different patterns will cause an optical Mura phenomenon (for example, dot Mura, line Mura, block Mura, etc. in the dark state, and differences in brightness at different azimuths in the bright state).

Figure 1:
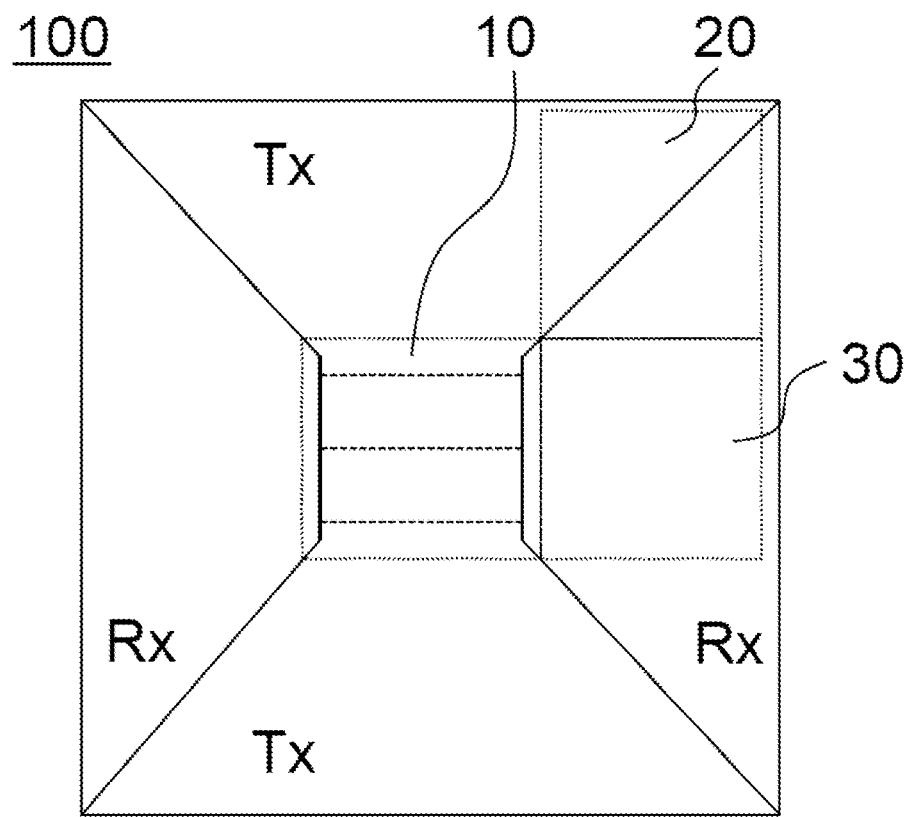
FIG. 1 illustrates the basic structure of a touch unit.
Figure 2:
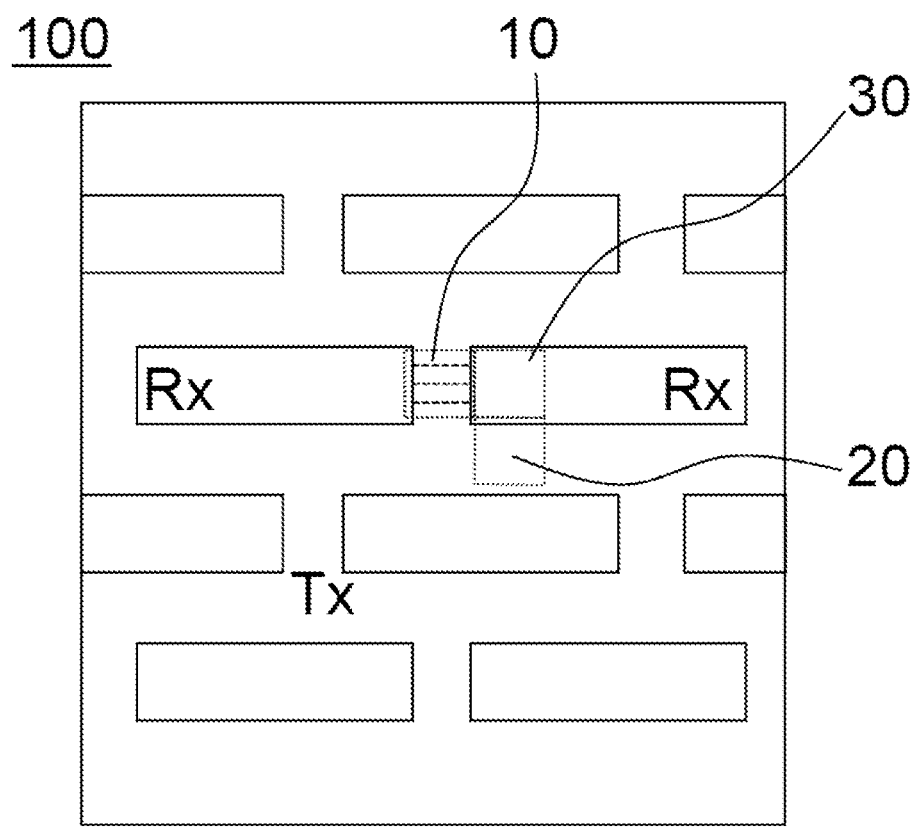
FIG. 2 illustrates the basic structure of another touch unit.

A touch unit is generally composed of two adjacent transmitting electrode patterns and two adjacent sensing electrode patterns, wherein the transmitting electrode patterns and the sensing electrode patterns substantially occupy half of the area. As shown in FIGS. 1 and 2, in a touch unit 100 of a touch module, the bridging position of a transmitting electrode (Tx) or a sensing electrode (Rx) is defined as a bridging region 10, the boundary between the transmitting electrode and the sensing electrode is defined as a boundary region 20, and the remaining region is a main body region 30 of the transmitting electrode or the sensing electrode. If there are deficiencies in the bridging distance of the bridging region 10 and the pattern design of the metal mesh, they will cause serious dot or block Mura.

In the touch unit 100 shown in FIGS. 1 and 2, the bridging region is a portion denoted by a dashed frame 10, which is composed of a Tx connection portion and an Rx connection portion. The Tx connection portion connects adjacent transmitting electrode patterns (Tx) inside the touch unit 100, and the Rx connection portion connects adjacent sensing electrode patterns (Rx) inside the touch unit 100. The Tx connection portion and the Rx connection portion constitute a laminated structure.

Figure 4:
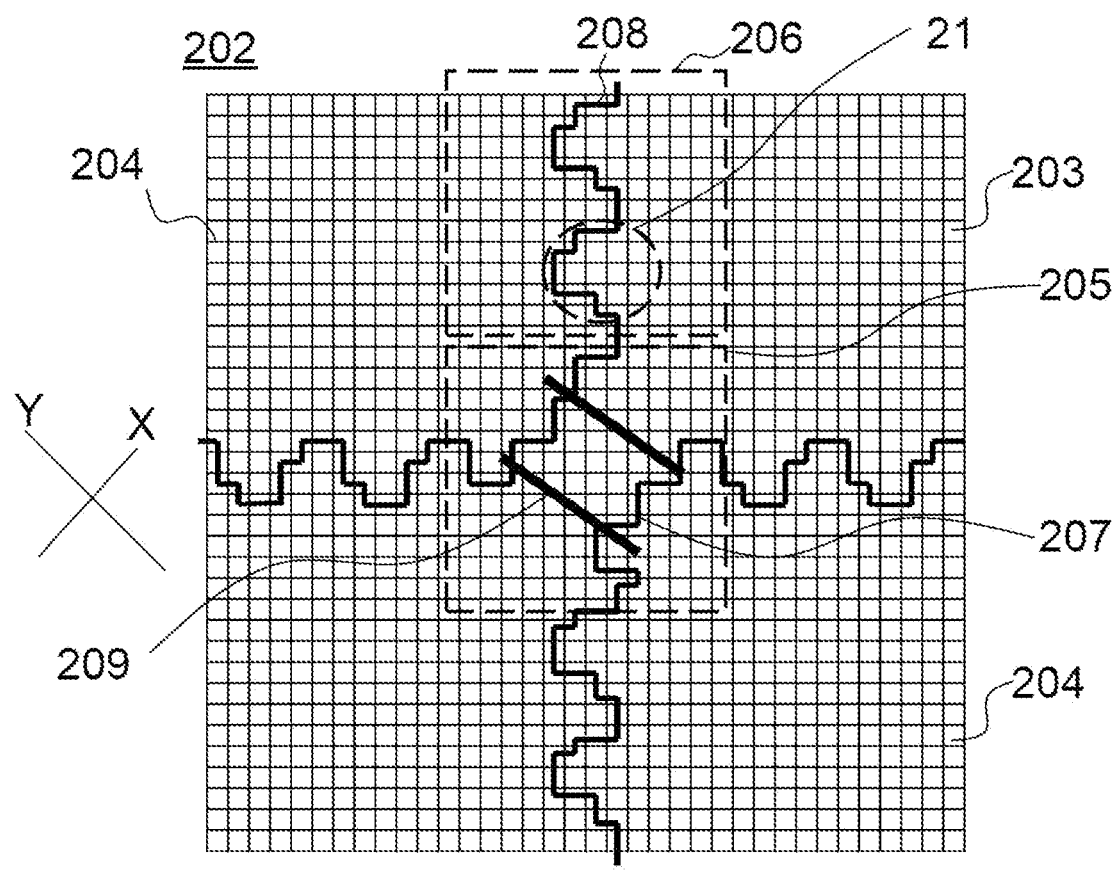
FIG. 4 illustrates a schematic structural view of a touch unit according to an embodiment of the present disclosure.
Figure 5:
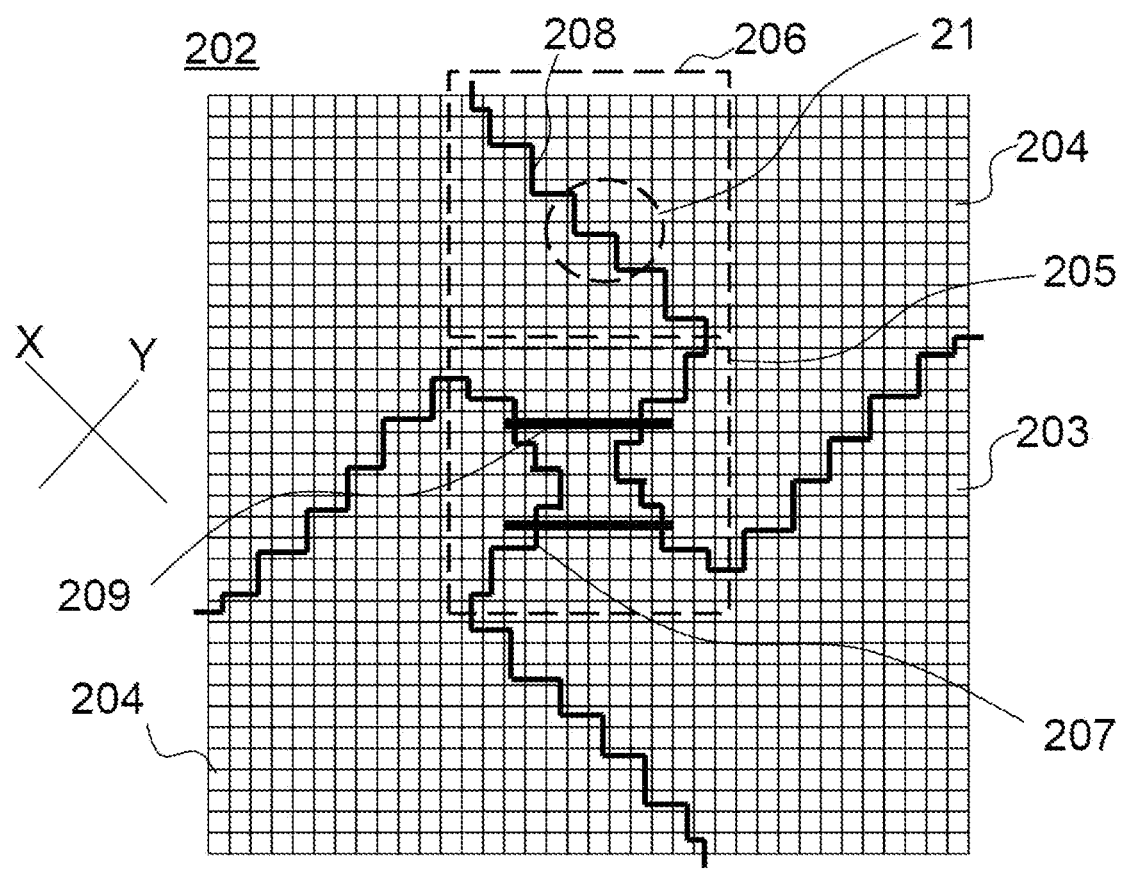
FIG. 5 illustrates a schematic structural view of a touch unit according to another embodiment of the present disclosure.
Figure 6:
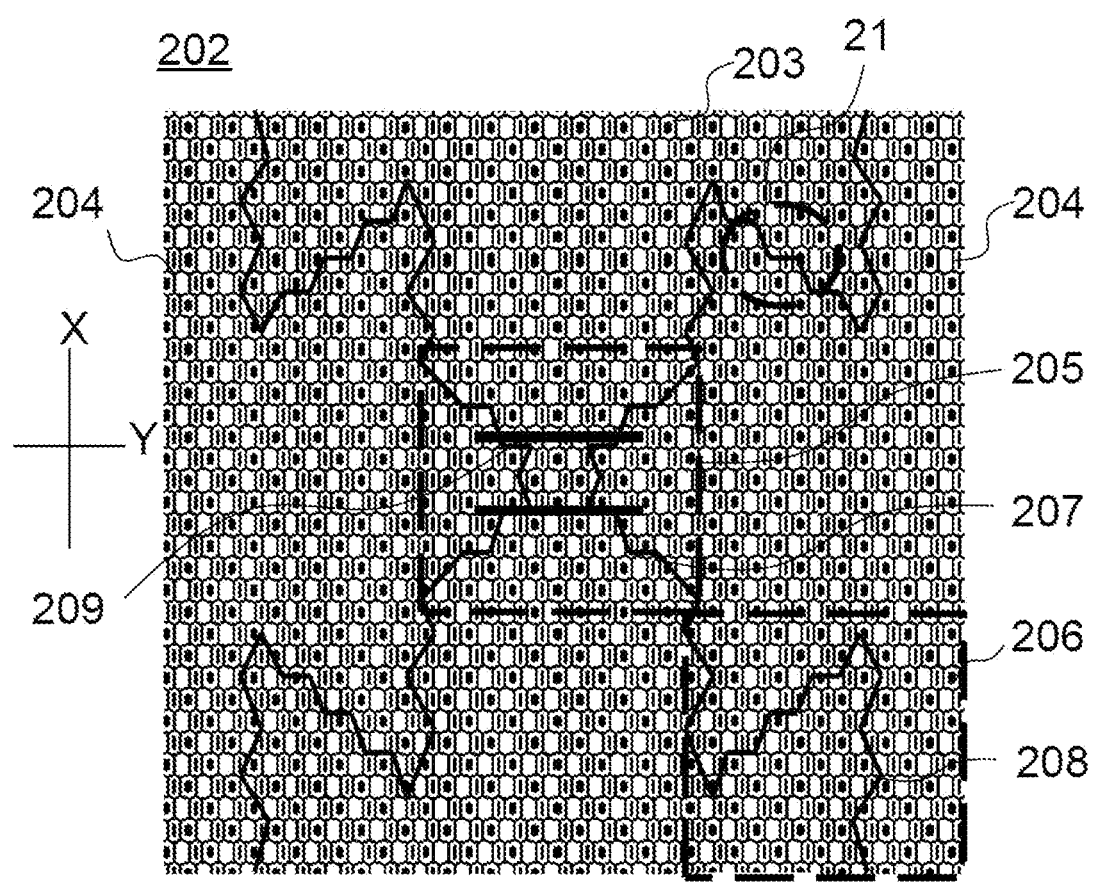
FIG. 6 illustrates a schematic structural view of a touch unit according to a further embodiment of the present disclosure.
Figure 9:
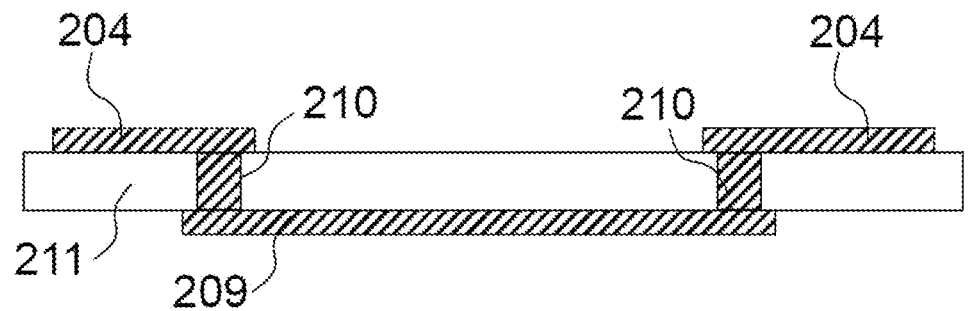
FIG. 9 illustrates a schematic structural view of a bridge of a touch unit according to an embodiment of the present disclosure.

In a touch unit 202 shown in FIGS. 4-6, the bridging region is a portion denoted by a dashed frame 205, which is composed of a connection portion of a first touch electrode 203 and a connection portion of a second touch electrode 204. The connection portion of the second touch electrode 204 may be a bridge 209 as shown in FIG. 9. The connection portion of the first touch electrode 203 and the bridge 209 constitute a laminated structure.

In some embodiments, the connection portion of the first touch electrode 203 in the bridging region may include one or more conductive patterns, and the connection portion (for example, the bridge 209) of the second touch electrode 204 in the bridging region may also include one or more conductive patterns.

Figure 3:
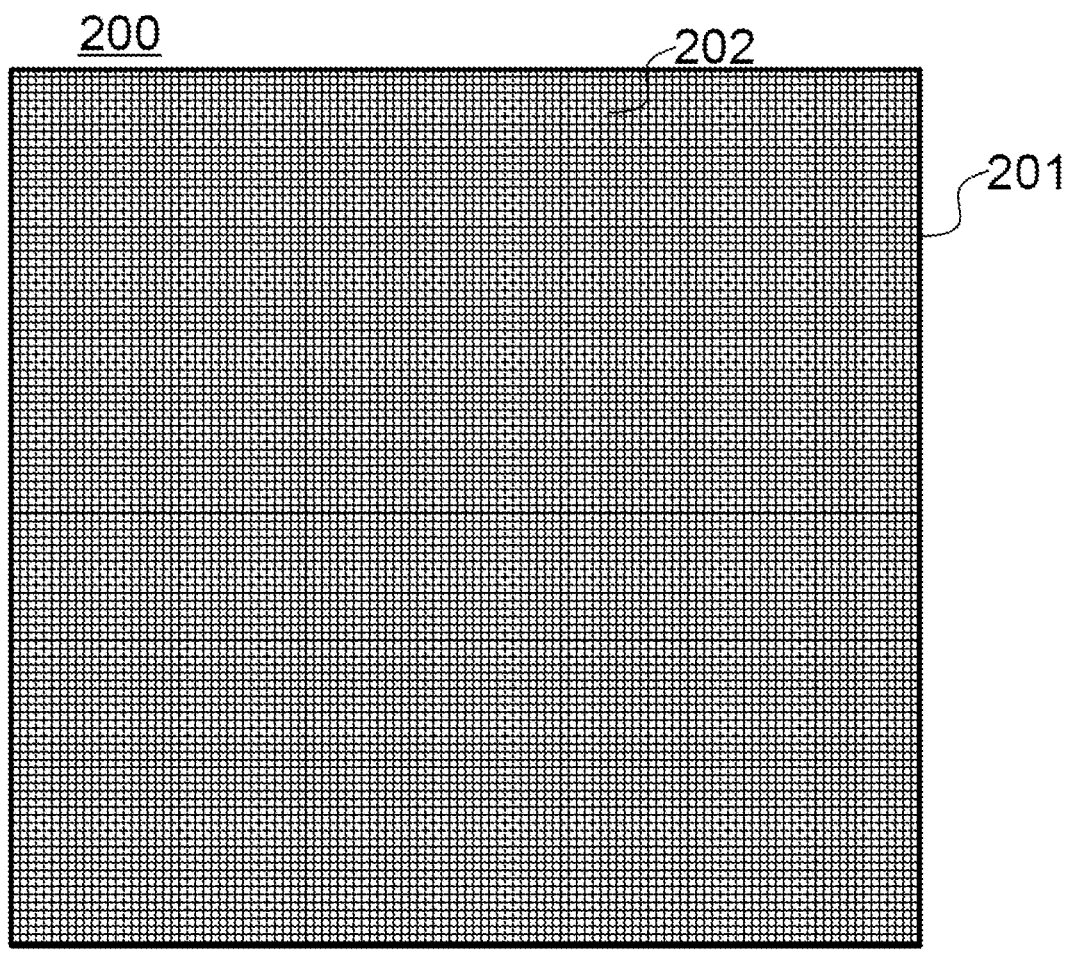
FIG. 3 illustrates a schematic structural view of a touch module according to an embodiment of the present disclosure.

According to an aspect of the present disclosure, there is provided a touch module. FIG. 3 illustrates a schematic structural view of a touch module according to an embodiment of the present disclosure. As shown in FIG. 3, a touch module 200 comprises: a base substrate 201; an array of touch units 202 arranged on the base substrate 201. As shown in FIGS. 4, 5 and 6, the touch unit 202 comprises a first touch electrode 203 extending along a first direction X and two second touch electrodes 204 arranged on two sides of the first touch electrode along a second direction Y, the first direction X and the second direction Y intersecting each other. The touch unit 202 further comprises: a bridging region 205 (denoted by a dashed frame shown in FIGS. 4, 5 and 6) between the two second touch electrodes 204, and a boundary region 206 between the first touch electrode 203 and each of the second touch electrodes 204. The bridging region 205 includes a first cutting pattern 207, the boundary region 206 includes a second cutting pattern 208, and the first cutting pattern 207 and the second cutting pattern 208 are substantially the same. "Substantially the same" indicates that the first cutting pattern 207 and the second cutting pattern 208 have substantially the same contour, for example, it may indicate a change rule of the contour patterns, and at least one of the structure, length, shape, etc. of each pattern constituent part is substantially identical. Said "substantially" means being completely identical or allowing some parts to be incompletely identical, and guaranteeing a similarity of 50%, 60%, 70%, 80%, 90% or more.

As shown in FIGS. 4 and 5, there are two boundary lines between the first touch electrode 203 and the second touch electrodes 204 in one touch unit 202, each boundary line including the first cutting pattern 207 and the second cutting pattern 208. These two boundary lines are substantially identical after being rotated by 180 degrees. "Substantially identical" means being completely identical or allowing some parts to be incompletely identical, and guaranteeing a similarity of 50%, 60%, 70%, 80%, 90% or more.

As shown in FIG. 6, there are two boundary lines between the first touch electrode 203 and the second touch electrodes 204 in one touch unit 202, each boundary line including the first cutting pattern 207 and the second cutting pattern 208. These two boundary lines are substantially identical with respect to a virtual axisymmetric centerline. "Substantially identical" means being completely identical or allowing some parts to be incompletely identical, and guaranteeing a similarity of 50%, 60%, 70%, 80%, 90% or more.

According to an embodiment of the present disclosure, the first cutting pattern 207 of the bridging region 205 may be designed based on the second cutting pattern 208 of the boundary region 206. At the boundary between the bridging region 205 and the boundary region 206, the first cutting pattern 207 and the second cutting pattern 208 are connected. On this premise, the morphology of the first cutting pattern 207 is kept as consistent with the morphology of the second cutting pattern 208 as possible.

In the embodiments shown in FIGS. 4 and 5, the boundary region and the bridging region each may be composed of a 12*12 metal mesh (corresponding to 12*12 sub-pixels). For the layout of the first cutting pattern 207 and the second cutting pattern 208, continuously connected horizontal cutting openings (i.e., openings generated by the intersections of the first cutting pattern 207 and the second cutting pattern 208 with the metal mesh) cannot exceed 3 sub-pixels, and cannot exceed 5 sub-pixels at most. Continuously connected vertical sub-pixels cannot exceed 3 sub-pixels, and cannot exceed 5 sub-pixels at most. The cutting openings can be adjusted locally, so that the transverse, longitudinal and total cutting opening densities in the bridging region are consistent with the cutting opening density in the non-bridging region, and the resulting cutting openings in the bridging region and the boundary region have similar pattern morphologies.

The embodiment in FIG. 6 includes cutting openings in three directions, which are cutting openings at 0° (horizontal direction), 45°, and 135° respectively. Continuously connected openings in each direction cannot extend beyond 3 sub-pixels, and cannot extend beyond 5 sub-pixels at most.

In the embodiments shown in FIGS. 4-6, all the cutting openings should be on the metal mesh. For example, the cutting opening in the horizontal direction cannot overlap the metal strip of the metal mesh in the horizontal direction.

It is to be noted that, in FIG. 3, multiple rectangles represent an array of touch units 202. In FIGS. 4 and 5, multiple rectangles represent regions of multiple sub-pixels to which the touch unit 202 corresponds. In FIG. 6, multiple hexagons represent regions of multiple sub-pixels to which the touch unit 202 corresponds.

According to an embodiment of the present disclosure, in the same touch unit, the first cutting pattern of the bridging region and the second cutting pattern of the boundary region are substantially the same. Therefore, when the touch module is used in a touch display device, the Mura phenomenon (or moiré phenomenon) caused by the bridging region and the boundary region is alleviated.

Therefore, the present disclosure further provides a design method for an FMLOC (Flexible Multi-Layer On Cell) structure. The bridging region and the boundary region of Tx and Rx in a complete FMLOC cycle are designed, so that the first cutting pattern of the bridging region and the second cutting pattern of the boundary region are substantially the same. Combined with optical Mura simulation, an optimized design of the bridging region can be obtained, in which Mura resulting from superimposition of the FMLOC and the OLED is significantly alleviated. In addition, the bridging distance between Rx and Rx (or between Tx and Tx) may also be taken into account for setting the bridging region.

The present disclosure may also be applied to other types of multilayer On Cell structures and devices, and is particularly suitable for a metal mesh On Cell touch structure.

In the embodiments of the present disclosure, the first touch electrode 203 may be a transmitting electrode (Tx), and the first touch electrode 203 may also be a sensing electrode (Rx). The second touch electrodes 204 may be sensing electrodes (Rx), and the second touch electrodes 204 may also be transmitting electrodes (Tx). For example, in an embodiment, the first touch electrode 203 is a transmitting electrode (Tx), and the second touch electrodes 204 are sensing electrodes (Rx). In another embodiment, the first touch electrode 203 is a sensing electrode (Rx), and the second touch electrodes 204 are transmitting electrodes (Tx).

Optionally, in some embodiments, as shown in FIGS. 4 and 6, the first cutting pattern 207 and the second cutting pattern 208 have a broken line shape.

Optionally, in some embodiments, as shown in FIG. 5, the first cutting pattern 207 and the second cutting pattern 208 have a stepped shape.

In the context of the present disclosure, the "broken line shape" refers to a shape composed of a plurality of line segments, and the "step shape" refers to a shape composed of a plurality of line segments alternately arranged in two mutually perpendicular directions.

Those skilled in the art can understand that the first cutting pattern and the second cutting pattern may have a broken line shape, a stepped shape, a linear shape, a curved shape, an irregular shape, or the like.

Optionally, in some embodiments, as shown in FIGS. 4, 5 and 6, in the same touch unit 202, the bridging region 205 and the boundary region 206 have substantially the same area.

"Substantially the same area" refers to areas having a similarity of at least 80%, 90% or more, and includes completely the same area.

As a result, a compact and uniform touch unit array can be obtained.

Figure 7:
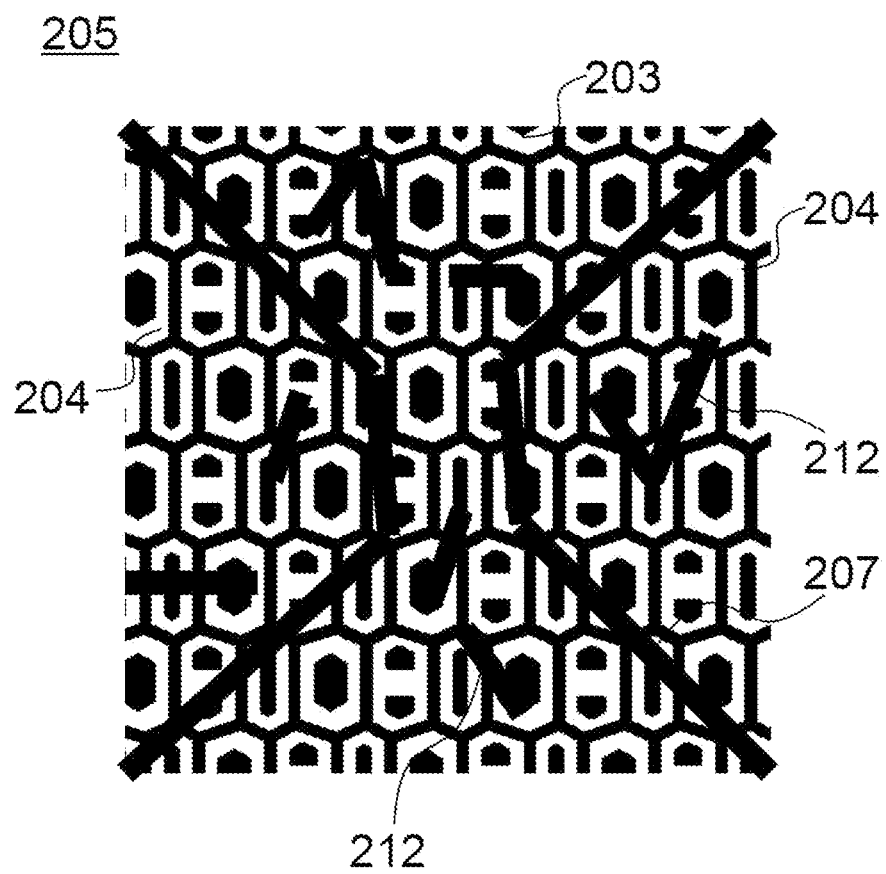
FIG. 7 illustrates a schematic structural view of a bridging region of a touch unit according to an embodiment of the present disclosure.
Figure 8:
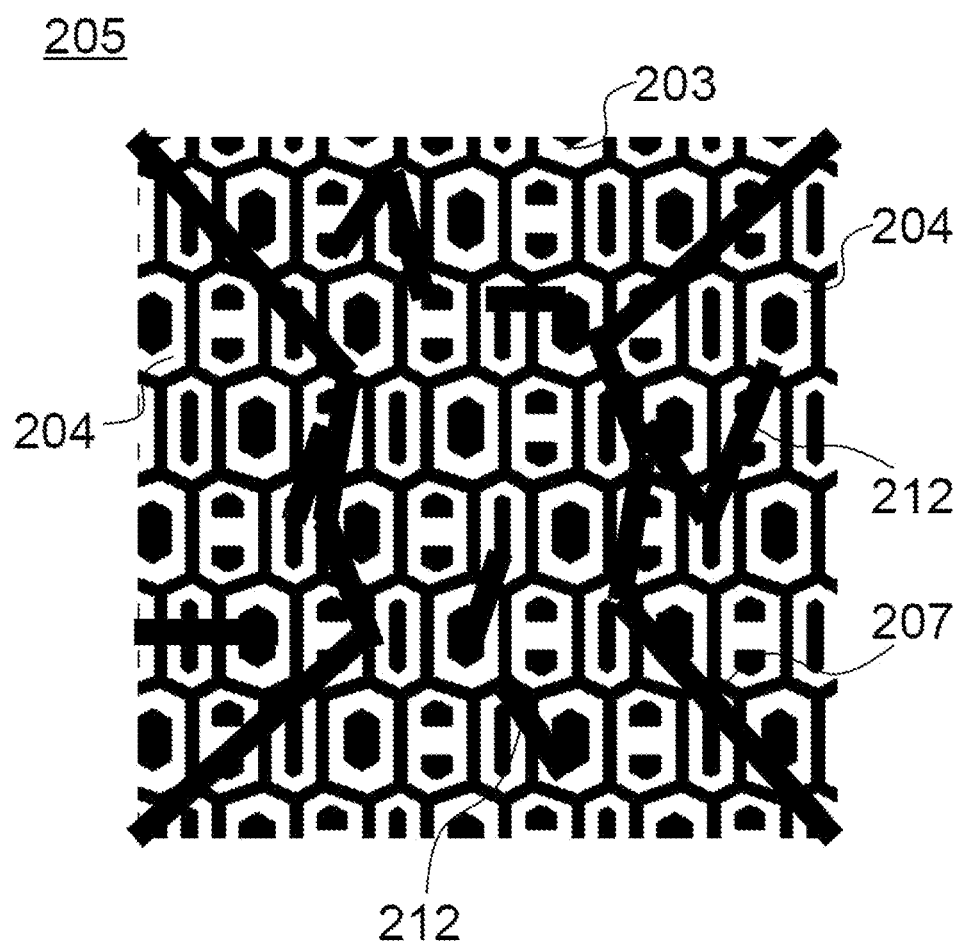
FIG. 8 illustrates a schematic structural view of a bridging region of a touch unit according to another embodiment of the present disclosure.

FIG. 7 illustrates a schematic structural view of a bridging region of a touch unit according to an embodiment of the present disclosure. FIG. 8 illustrates a schematic structural view of a bridging region of a touch unit according to another embodiment of the present disclosure.

Optionally, in some embodiments, as shown in FIGS. 7 and 8, in the same touch unit 202, two second touch electrodes 204 are spaced apart by 1 to 5 sub-pixels.

In the context of the present disclosure, the "distance between two second touch electrodes" may be measured by the number of complete sub-pixels exposed at the shortest distance between the two second touch electrodes. Therefore, the "distance between two second touch electrodes" has nothing to do with actual measured values such as the width or length of a sub-pixel. As shown in FIG. 7, in the same touch unit 202, two second touch electrodes 204 is spaced apart by one sub-pixel. As shown in FIG. 8, in the same touch unit 202, two second touch electrodes 204 are spaced apart by three sub-pixels.

Optionally, in some embodiments, as shown in FIG. 9, in the same touch unit, a bridge 209 that bridges two second touch electrodes 204 spans 1 to 5 sub-pixels.

FIG. 9 illustrates a schematic structural view of a bridge of a touch unit according to an embodiment of the present disclosure. In some embodiments, as shown in FIG. 9, the two second touch electrodes 204 are connected to each other through a via hole 210 and a bridge 209, and the via hole 210 penetrates an insulating layer (or a passivation layer) 211. Those skilled in the art can understand that the bridge 209 spans the bridging region, and the material of the bridge 209 may be a metal or a conductive metal oxide.

Optionally, in some embodiments, as shown in FIGS. 7 and 8, at least one of the first touch electrode 203 and the second touch electrodes 204 further includes a plurality of third cutting patterns 212 (denoted by short lines shown in the figures). With the plurality of third cutting patterns 212, the Mura phenomenon can be further suppressed. For example, it is possible to design a plurality of third cutting patterns 212 in the boundary region 206 of the touch unit 202, and replicate the same patterns in in the bridging region 205 and the main body region, so that the third cutting pattern 212 is arranged in the entire touch unit 202.

Figure 10:
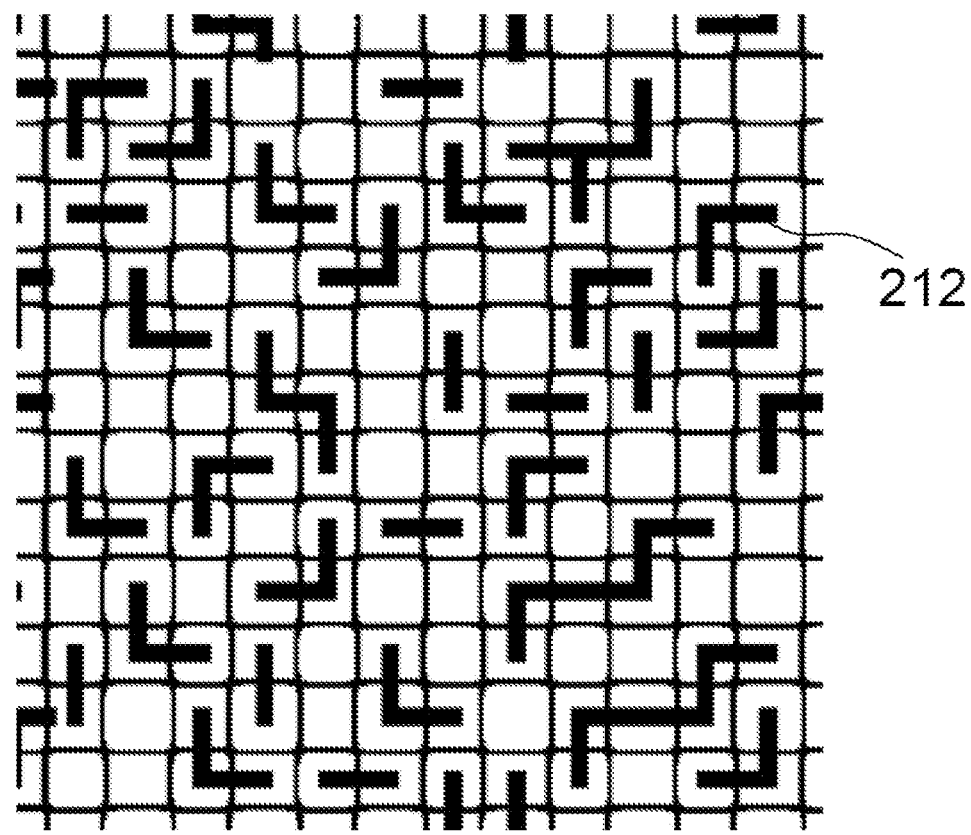
FIG. 10 illustrates a third cutting pattern of a touch unit according to an embodiment of the present disclosure.
Figure 11:
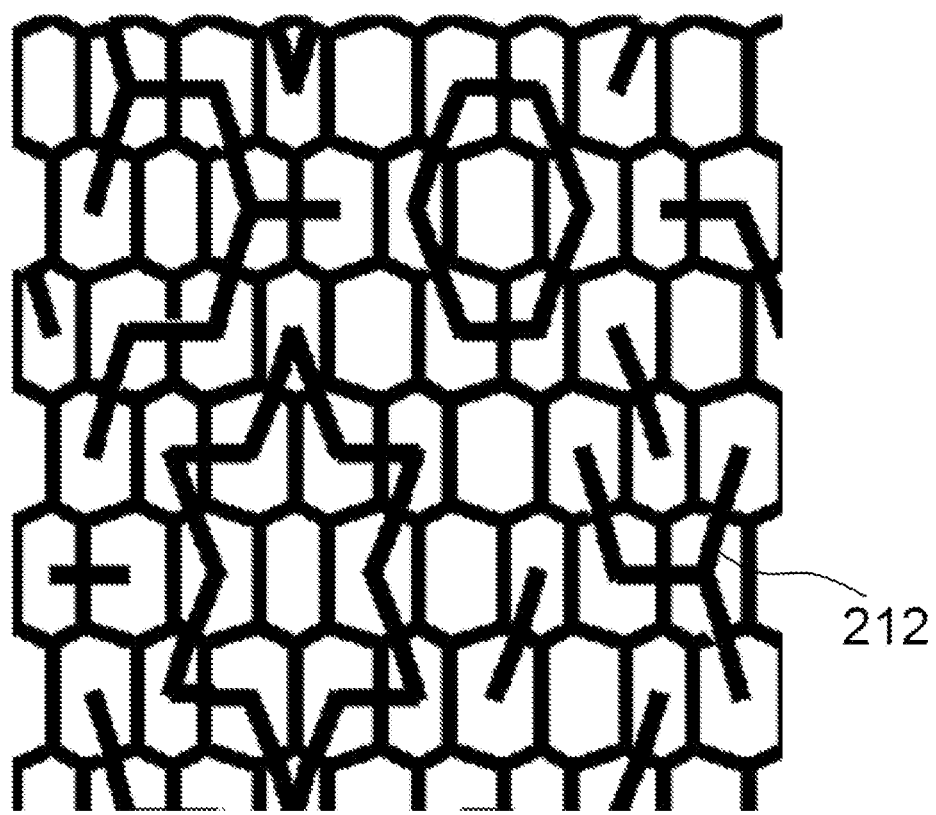
FIG. 11 illustrates a third cutting pattern of a touch unit according to another embodiment of the present disclosure.

In addition, as shown in FIGS. 10 and 11, the third cutting pattern 212 may be arranged according to a specific distribution of sub-pixels. The third cutting pattern 212 may serve as, for example, a dummy pattern in the main body region of the touch electrode to meet electrical requirements.

Specifically, the arrangement of the third cutting pattern 212 may follow the following rules. Firstly, it is necessary to ensure that the density of the cut openings in the boundary region is equal to the density of the cut openings in the non-boundary region (including the bridging region and the main body region). Secondly, it is necessary to ensure that the third cutting pattern 212 in the boundary region is consistent with the third cutting pattern 212 in the non-boundary region. Of course, it is also required to ensure that the first cutting pattern 207 and the second cutting pattern 208 separate Tx from Rx. In the pixel structure shown in FIG. 10, the numbers of cut openings corresponding to the horizontal direction and the vertical direction of the touch unit should be approximately equal. In addition, it should be further ensured that the cutting openings of the touch unit resulting from the third cutting patterns 212 in a certain direction are evenly arranged.

Optionally, in some embodiments, the first touch electrode 203 and the second touch electrodes 204 each includes a metal mesh (as shown by the meshes in FIGS. 4-8, 10 and 11). In the touch unit 202, the cutting openings (i.e., openings generated by the intersections of the third cutting patterns with the metal mesh) on the metal mesh generated by the plurality of third cutting patterns 212 have a uniform distribution density.

Generally, the shape of the metal mesh and the positions of mesh openings may correspond to the shape and positions of sub-pixels of a display panel to which the touch module is adapted.

In the context of the present disclosure, the "distribution density" of the cutting openings in the metal mesh refers to the ratio of the number of cutting openings in a repeating unit to the number of mesh patterns in the repeating unit in a certain direction. For example, among 100 metal wires extending in a certain direction, 20 metal wires have fractures, so the "distribution density" of the cutting openings in this direction is 20%. In some embodiments, the "distribution densities" of the cutting openings in all directions are equal to each other.

Figure 14:
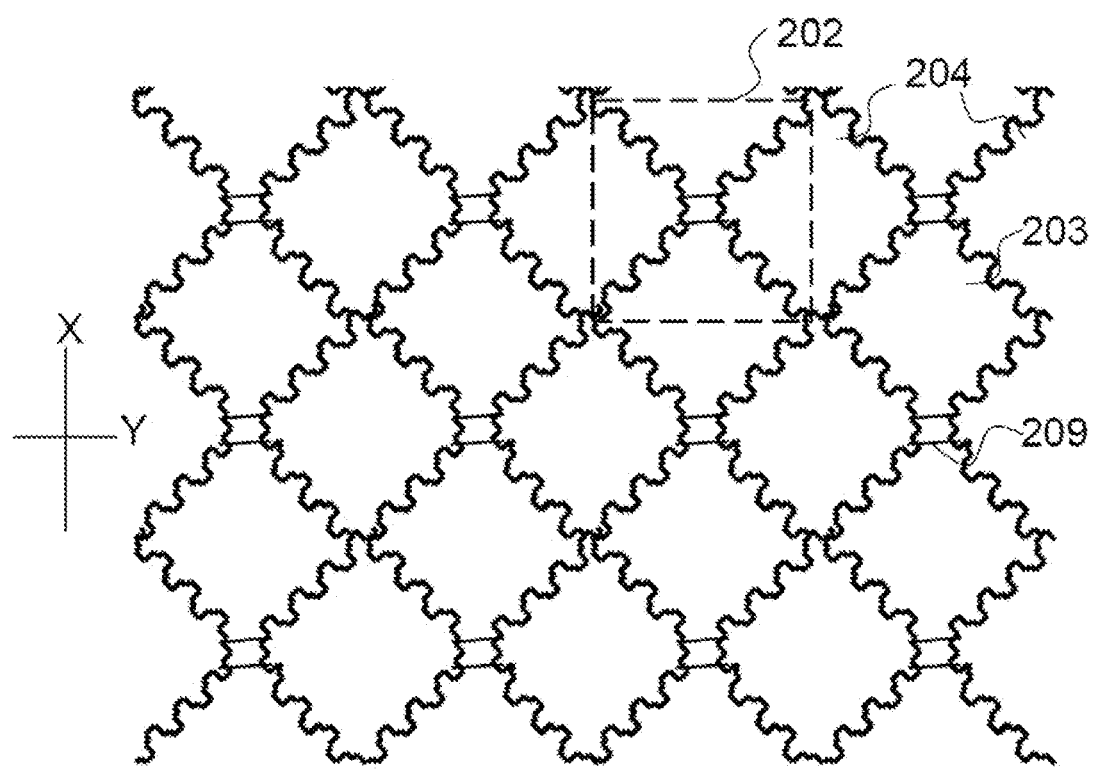
FIG. 14 is a schematic view illustrating the arrangement of touch units according to an embodiment of the present disclosure.

FIG. 14 illustrates a schematic view of the arrangement of touch units according to an embodiment of the present disclosure. The array of touch units may include a plurality of touch units 202 as shown in FIG. 4. The touch unit 202 comprises a first touch electrode 203 extending along a first direction X and two second touch electrodes 204 arranged on two sides of the first touch electrode along a second direction Y The first direction X and the second direction Y intersect each other. When the touch unit shown in FIG. 5 or FIG. 6 is used, the same or similar arrangement of touch units as shown in FIG. 14 can also be obtained.

According to another aspect of the present disclosure, there is provided a touch module. FIG. 3 illustrates a schematic structural view of a touch module according to an embodiment of the present disclosure. As shown in FIG. 3, the touch module 200 comprises: a base substrate 201; an array of touch units 202 arranged on the base substrate 201. As shown in FIGS. 4, 5 and 6, the touch unit 202 comprises a first touch electrode 203 extending along a first direction X, and two second touch electrodes 204 arranged on two sides of the first touch electrode along a second direction Y. The first direction X and the second direction Y intersect each other. The touch unit 202 further comprises: a bridging region 205 (denoted by a dashed frame shown in FIGS. 4, 5 and 6) between the two second touch electrodes 204, and a boundary region 206 between the first touch electrode 203 and each of the second touch electrodes 204. The bridging region 205 includes a first cutting pattern 207, the boundary region 206 includes a second cutting pattern 208, and the first cutting pattern 207 and the second cutting pattern 208 are composed of the same unit pattern 21 having a broken line shape.

For example, in the embodiment shown in FIG. 4, the first cutting pattern 207 and the second cutting pattern 208 are composed of the same unit pattern 21 (a pattern in a broken line shape). In the embodiment shown in FIG. 5, the first cutting pattern 207 and the second cutting pattern 208 are composed of the same unit pattern 21 (a pattern in a stepped shape). In the embodiment shown in FIG. 6, the first cutting pattern 207 and the second cutting pattern 208 are composed of the same unit pattern 21 (a pattern in the shape of a broken line with an included angle of about 135').

According to an embodiment of the present disclosure, in the same touch unit, the first cutting pattern of the bridging region and the second cutting pattern of the boundary region are substantially the same. Therefore, when the touch module is used in a touch display device, the Mura phenomenon (or moiré phenomenon) caused by the bridging region and the boundary region is alleviated.

Figures 12, 13:
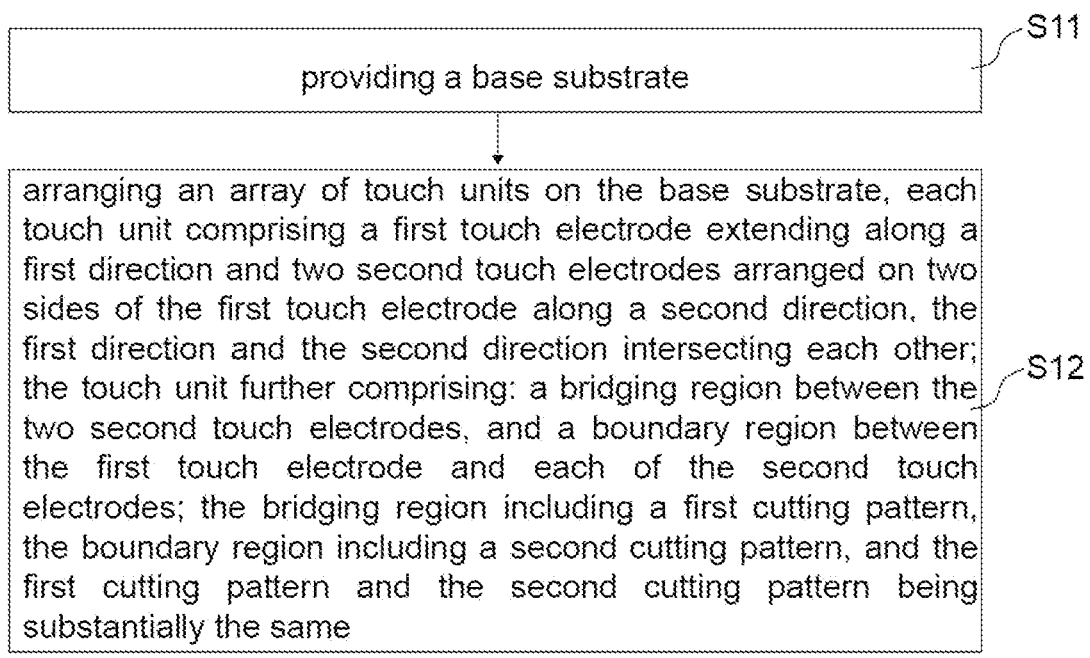
FIG. 12 illustrates a schematic structural view of a touch display device according to an embodiment of the present disclosure.
FIG. 13 illustrates a flow chart of a manufacturing method of a touch module according to an embodiment of the present disclosure.

According to a further aspect of the present disclosure, there is provided a touch display device. FIG. 12 illustrates a schematic structural view of a touch display device according to an embodiment of the present disclosure. As shown in FIG. 12, the touch display device 300 comprises a display panel 301 and the touch module 200 described in any of the foregoing embodiments, and the touch module 200 is arranged on a light exit surface of the display panel 301.

The touch display device provided by the embodiment of the present disclosure has the same advantages as the abovementioned touch module, which will not be repeated here.

Optionally, in some embodiments, as shown in FIGS. 4 and 6, the first cutting pattern 207 and the second cutting pattern 208 have a broken line shape.

Optionally, in some embodiments, as shown in FIG. 5, the first cutting pattern 207 and the second cutting pattern 208 have a stepped shape.

Those skilled in the art can understand that the first cutting pattern and the second cutting pattern may have a broken line shape, a stepped shape, a linear shape, a curved shape, an irregular shape, or the like.

Optionally, in some embodiments, as shown in FIGS. 4, 5 and 6, in the same touch unit 202, the bridging region 205 and the boundary region 206 have substantially the same area. As a result, a compact and uniform touch unit array can be obtained.

FIG. 7 illustrates a schematic structural view of a bridging region of a touch unit according to an embodiment of the present disclosure. FIG. 8 illustrates a schematic structural view of a bridging region of a touch unit according to another embodiment of the present disclosure.

Optionally, in some embodiments, as shown in FIGS. 7 and 8, in the same touch unit 202, two second touch electrodes 204 are spaced apart by 1 to 5 sub-pixels.

As shown in FIG. 7, in the same touch unit 202, two second touch electrodes 204 are spaced apart by one sub-pixel. As shown in FIG. 8, in the same touch unit 202, two second touch electrodes 204 are spaced apart by three sub-pixels.

Optionally, in some embodiments, as shown in FIG. 9, in the same touch unit, a bridge 209 that bridges two second touch electrodes 204 spans 1 to 5 sub-pixels.

FIG. 9 illustrates a schematic structural view of a bridge of a touch unit according to an embodiment of the present disclosure. In some embodiments, as shown in FIG. 9, the two second touch electrodes 204 are connected to each other through a via hole 210 and a bridge 209, and the via hole 210 penetrates an insulating layer (or a passivation layer) 211. Those skilled in the art can understand that the bridge 209 spans the bridging region, and the material of the bridge 209 may be a metal or a conductive metal oxide.

Optionally, in some embodiments, as shown in FIGS. 7 and 8, at least one of the first touch electrode 203 and the second touch electrodes 204 further includes a plurality of third cutting patterns 212 (denoted by short lines shown in the figures). With the plurality of third cutting patterns 212, the Mura phenomenon can be further suppressed.

In addition, as shown in FIGS. 10 and 11, the third cutting pattern 212 may be arranged according to a specific distribution of sub-pixels. The third cutting pattern 212 may serve as, for example, a dummy pattern in the main body region of the touch electrode to meet electrical requirements.

Optionally, in some embodiments, the first touch electrode 203 and the second touch electrodes 204 include a metal mesh (denoted by a mesh shown in FIGS. 4-8, 10 and 11). In the touch unit 202, the cutting openings (i.e., openings generated by the intersections of the third cutting patterns 212 with the metal mesh) on the metal mesh generated by the plurality of third cutting patterns 212 have a uniform distribution density.

Generally, the shape of the metal mesh and the positions of mesh openings may correspond to the shape and positions of sub-pixels of a display panel to which the touch module is adapted.

According to yet another aspect of the present disclosure, there is provided a manufacturing method of a touch module. FIG. 13 illustrates a flow chart of a manufacturing method of a touch module according to an embodiment of the present disclosure. The method comprises: S11 providing a base substrate; S12 arranging an array of touch units on the base substrate, each touch unit comprising a first touch electrode extending along a first direction and two second touch electrodes arranged on two sides of the first touch electrode along a second direction, the first direction and the second direction intersecting each other. The touch unit further comprises: a bridging region between the two second touch electrodes, and a boundary region between the first touch electrode and the second touch electrodes. The bridging region includes a first cutting pattern, the boundary region includes a second cutting pattern, and the first cutting pattern and the second cutting pattern are substantially the same. "Substantially the same" indicates that the first cutting pattern and the second cutting pattern have substantially the same contour, for example, it may indicate a change rule of the contour patterns, and at least one of the structure, length, shape, etc. of each pattern constituent part is substantially identical. Said "substantially" means being completely identical or allowing some parts to be incompletely identical, and guaranteeing a similarity of 50%, 60%, 70%, 80%, 90% or more.

As shown in FIGS. 4 and 5, there are two boundary lines between the first touch electrode 203 and the second touch electrodes 204 in one touch unit 202, each boundary line including the first cutting pattern 207 and the second cutting pattern 208. These two boundary lines are substantially identical after being rotated by 180 degrees. "Substantially identical" means being completely identical or allowing some parts to be incompletely identical, and guaranteeing a similarity of 50%, 60%, 70%, 80%, 90% or more.

As shown in FIG. 6, there are two boundary lines between the first touch electrode 203 and the second touch electrodes 204 in one touch unit 202, each boundary line including the first cutting pattern 207 and the second cutting pattern 208. These two boundary lines are substantially identical with respect to a virtual axisymmetric centerline. "Substantially identical" means being completely identical or allowing some parts to be incompletely identical, and guaranteeing a similarity of 50%, 60%, 70%, 80%, 90% or more.

According to an embodiment of the present disclosure, in the same touch unit, the first cutting pattern of the bridging region and the second cutting pattern of the boundary region are substantially the same. Therefore, when the touch module is used in a touch display device, the Mura phenomenon (or moiré phenomenon) caused by the bridging region and the boundary region is alleviated.

Those skilled in the art can understand that the first cutting pattern, the second cutting pattern, and the third cutting pattern in the present disclosure are essentially slits, and the first cutting pattern, the second cutting pattern and/or the third cutting pattern can be formed on the first touch electrode and the second touch electrodes using processes such as photolithography and sawing. Since the first cutting pattern of the bridging region and the second cutting pattern of the boundary region are substantially the same, when the first cutting pattern, the second cutting pattern and/or the third cutting pattern are formed on the first touch electrode and the second touch electrodes using a photolithography process, the same mask plate may be used to perform multiple partial exposures on the base substrate of the touch module, thereby obtaining a large-sized touch module.

In the description of the present disclosure, the orientations or positional relationships indicated by the terms "upper", "lower", etc. are based on the orientations or positional relationships illustrated in the drawings, which are only for the convenience of describing the present disclosure and do not require the present disclosure to be necessarily constructed and operated in a specific orientation, and therefore cannot be understood as a limitation to the present disclosure.

In the description of this specification, the description with reference to the terms "an embodiment", "another embodiment", etc. means that specific features, structures, materials or characteristics described in conjunction with the embodiment are included in at least one embodiment of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art may combine different embodiments or examples and the features of the different embodiments or examples described in this specification in the case of causing no conflict. Furthermore, it is to be noted that in this specification, the terms "first" and "second" are only used for descriptive purposes, and cannot be understood as indicating or implying relative importance or implicitly indicating the number of indicated technical features.

What have been stated above are only specific embodiments of the present disclosure, but the protection scope of the present disclosure is not limited thereto. Any variations or substitutions that can be easily conceived by those skilled in the art familiar with this technical field within the technical scope revealed by the present disclosure should be encompassed within the protection scope of the present disclosure. Thus, the protection scope of the present disclosure should be based on the protection scope of the claims.

What is claimed is:

1. A touch module, comprising:
    a base substrate;
    an array of touch units arranged on the base substrate, each touch unit comprising a first touch electrode extending along a first direction and two second touch electrodes arranged on two sides of the first touch electrode along a second direction, the first direction and the second direction intersecting each other;
    wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are substantially the same,
    wherein at least one of the first touch electrode and the second touch electrodes further comprises a plurality of third cutting patterns which serve as dummy patterns, and
    wherein the first touch electrode and the second touch electrodes are composed of a metal mesh, in the touch unit, cutting openings on the metal mesh that are generated by the plurality of third cutting patterns have a uniform distribution density, the cutting openings refer to openings generated by intersections of the plurality of third cutting patterns with the metal mesh, and the cutting openings extend across multiple sub-pixel patterns within the metal mesh.

2. The touch module according to claim 1, wherein in a same touch unit, the bridging region has an area substantially the same as that of the boundary region.

3. The touch module according to claim 1, wherein in a same touch unit, the two second touch electrodes are spaced apart by 1 to 5 sub-pixels.

4. The touch module according to claim 1, wherein the first cutting pattern and the second cutting pattern have a broken line shape.

5. The touch module according to claim 4, wherein the first cutting pattern and the second cutting pattern have a stepped shape.

6. The touch module according to claim 1, wherein in a same touch unit, a bridge that bridges the two second touch electrodes spans 1 to 5 sub-pixels.

7. A touch display device, comprising: a display panel and the touch module according to claim 1, the touch module being arranged on a light exit surface of the display panel.

8. The touch display device according to claim 7, wherein the first cutting pattern and the second cutting pattern have a broken line shape.

9. A touch module, comprising:
    a base substrate;
    an array of touch units arranged on the base substrate, each touch unit comprising a first touch electrode extending along a first direction and two second touch electrodes arranged on two sides of the first touch electrode along a second direction, the first direction and the second direction intersecting each other;
    wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are composed of a same unit pattern having a broken line shape,
    wherein at least one of the first touch electrode and the second touch electrodes further comprises a plurality of third cutting patterns which serve as dummy patterns, and
    wherein the first touch electrode and the second touch electrodes are composed of a metal mesh, in the touch unit, cutting openings on the metal mesh that are generated by the plurality of third cutting patterns have a uniform distribution density, the cutting openings refer to openings generated by intersections of the plurality of third cutting patterns with the metal mesh, and the cutting openings extend across multiple sub-pixel patterns within the metal mesh.

10. The touch module according to claim 9, wherein the first cutting pattern and the second cutting pattern have a stepped shape.

11. The touch module according to claim 9, wherein in a same touch unit, the bridging region has an area substantially the same as that of the boundary region.

12. The touch module according to claim 9, wherein in a same touch unit, the two second touch electrodes are spaced apart by 1 to 5 sub-pixels.

13. The touch module according to claim 9, wherein in a same touch unit, a bridge that bridges the two second touch electrodes spans 1 to 5 sub-pixels.

14. A manufacturing method of a touch module, comprising:
- providing a base substrate;
- arranging an array of touch units on the base substrate, each touch unit comprising a first touch electrode extending along a first direction and two second touch electrodes arranged on two sides of the first touch electrode along a second direction, the first direction and the second direction intersecting each other;
- wherein the touch unit further comprises: a bridging region between the two second touch electrodes, and a boundary region between the first touch electrode and each of the second touch electrodes; the bridging region comprises a first cutting pattern, the boundary region comprises a second cutting pattern, and the first cutting pattern and the second cutting pattern are substantially the same,
- wherein at least one of the first touch electrode and the second touch electrodes further comprises a plurality of third cutting patterns which serve as dummy patterns, and
- wherein the first touch electrode and the second touch electrodes are composed of a metal mesh, in the touch unit, cutting openings on the metal mesh that are generated by the plurality of third cutting patterns have a uniform distribution density, the cutting openings refer to openings generated by intersections of the plurality of third cutting patterns with the metal mesh, and the cutting openings extend across multiple sub-pixel patterns within the metal mesh.

\* \* \* \* \*